United States Patent [19]

Deluca et al.

[11] Patent Number: 6,008,737
[45] Date of Patent: *Dec. 28, 1999

[54] APPARATUS FOR CONTROLLING UTILIZATION OF SOFTWARE ADDED TO A PORTABLE COMMUNICATION DEVICE

[75] Inventors: Michael J. Deluca, Boca Raton; Doug Kraul; Walter L. Davis, both of Parkland, all of Fla.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/672,004

[22] Filed: Jun. 24, 1996

Related U.S. Application Data

[63] Continuation-in-part of application No. 08/452,785, May 30, 1995, Pat. No. 5,612,682.

[51] Int. Cl.⁶ ........................................... G07D 7/00
[52] U.S. Cl. .............................. 340/825.34; 340/825.34; 340/825.44; 455/408; 379/121; 705/32
[58] Field of Search ..................... 340/825.34, 825.44, 340/825.33, 825.35, 825.22; 455/426, 405, 406, 408; 395/200.01, 200.05, 230, 232, 228, 229; 379/114, 121

[56] References Cited

U.S. PATENT DOCUMENTS

| | | | |
|---|---|---|---|
| 4,875,038 | 10/1989 | Siwiak et al. | 340/825.44 |
| 5,155,680 | 10/1992 | Wiedemer | 395/232 |
| 5,325,418 | 6/1994 | McGregor et al. | 455/406 |
| 5,335,278 | 8/1994 | Matchett et al. | 340/825.34 |
| 5,371,493 | 12/1994 | Sharpe et al. | 340/825.33 |
| 5,493,492 | 2/1996 | Cramer et al. | 385/232 |
| 5,577,100 | 11/1996 | McGregor et al. | 455/406 |
| 5,606,497 | 2/1997 | Cramer et al. | 395/232 |
| 5,612,682 | 3/1997 | De Luca et al. | 340/825.44 |
| 5,633,932 | 5/1997 | Davis et al. | 340/825.34 |
| 5,652,793 | 7/1997 | Priem et al. | 340/825.34 |
| 5,664,006 | 9/1997 | Monte et al. | 455/405 |

*Primary Examiner*—Edwin C. Holloway, III
*Assistant Examiner*—Anthony A. Asongwed

[57] ABSTRACT

An apparatus at a fixed portion (102) of a communication system controls utilization of software (398) in a portable communication device (122) that includes a transceiver (302) for communicating with the fixed portion. The portable communication device receives (604) a request for utilization of the software. In response, the portable communication device seeks (612) a usage authorization for utilizing the software by generating (614) an external authorization request (428) that includes at least one of a size (396) of the software, a software name (394), a secure checksum, and an address (313) identifying the portable communication device, and by communicating (616) the external authorization request to the fixed portion. The secure checksum is a secure cyclic redundancy check of the software for which the portable communication device is requesting usage authorization, and is generated (624) by the portable communication device from a secure polynomial (311) stored in the portable communication device and separately by the apparatus from a same secure polynomial (230) stored in the apparatus. The portable communication device disallows (640) the utilization of the software, in response to the usage authorization being unobtainable.

9 Claims, 7 Drawing Sheets

APPARATUS FOR CONTROLLING UTILIZATION OF SOFTWARE ADDED TO A PORTABLE COMMUNICATION DEVICE

This application is a continuation-in-part of application Ser. No. 08/452,785 filed May 30, 1995, by Deluca et al., entitled "Method and Apparatus for Controlling Utilization of a Process Added to a Portable Communication Device", now U.S. Pat. No. 5,612,682, issued Mar. 18, 1997.

FIELD OF THE INVENTION

This invention relates in general to communication systems, and more specifically to a method and apparatus for controlling utilization of a process added to a portable communication device.

BACKGROUND OF THE INVENTION

In the past, paging devices were limited to alpha-numeric and voice paging. With technology improvements in circuit integration and more efficient communication protocols that provide two-way communication, paging devices have grown in sophistication and services provided. With today's technology improvements, paging devices are expected to acquire more sophisticated functions such as electronic mailing services, spread sheet applications, investment finance services such as stock market charts, quotation requests, purchase and sale transactions, etc. These services require sophisticated software applications and/or hardware modules to be operated in the paging device. Paging devices using sophisticated services such as these will require a means for registration and licensing to prevent unauthorized use of processes, including software applications and hardware modules. In prior art devices registration has been accomplished by mailing a signed certificate with a purchase receipt of a software application or hardware module. This form of registration, however, does not prevent an unscrupulous user from using pirated software applications and/or unauthorized hardware modules.

Thus, what is needed is a method and apparatus for controlling utilization of a process added to a portable communication device. Preferably, the method and apparatus should serve as a mechanism to prevent unauthorized use of software applications and hardware modules.

DESCRIPTION OF THE PREFERRED EMBODIMENT

Figure 1:
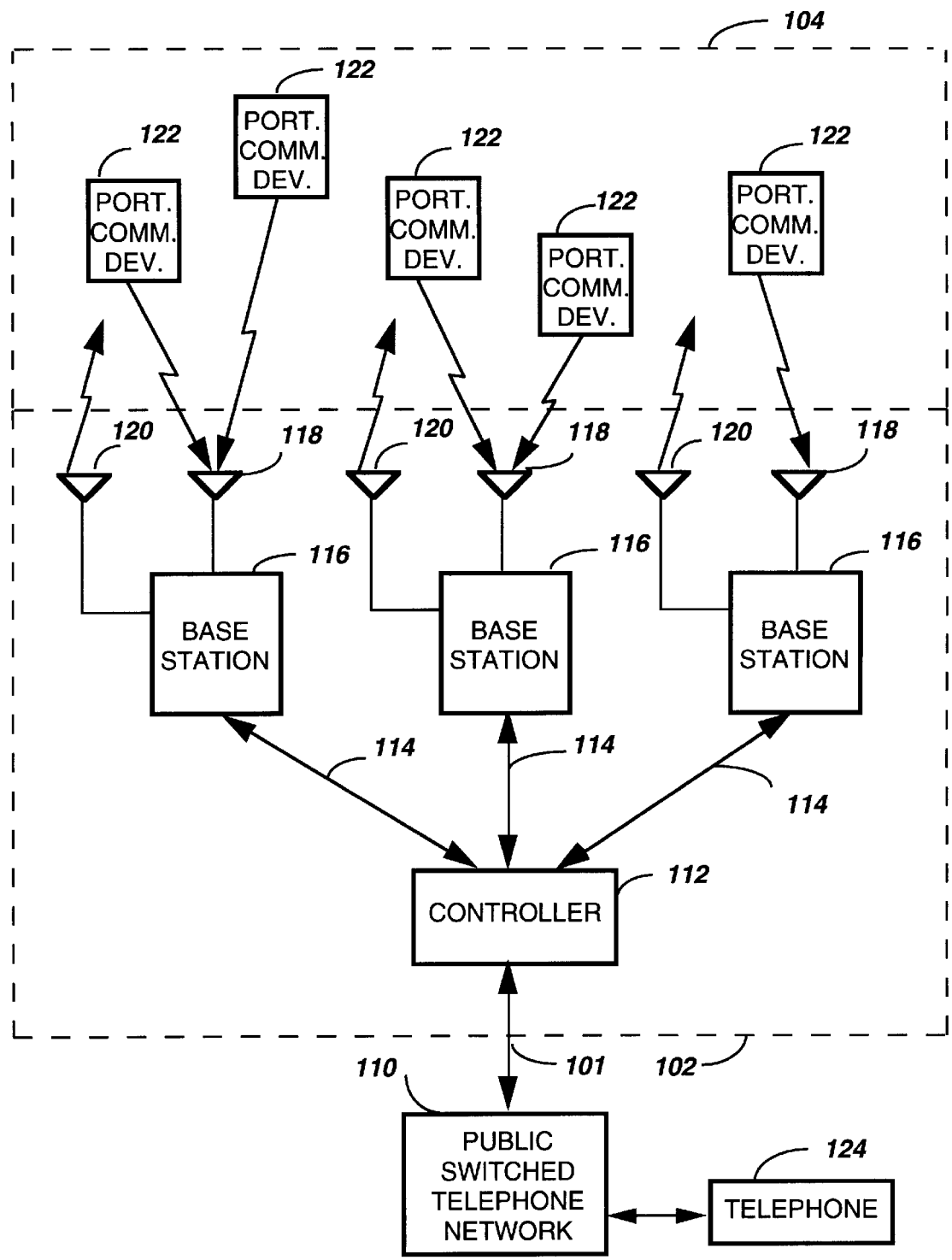
FIG. 1 is an electrical block diagram of a communication system in accordance with the preferred embodiment of the present invention.

Referring to FIG. 1, an electrical block diagram of a communication system in accordance with the preferred embodiment of the present invention comprises a fixed portion 102 and a portable portion 104. The fixed portion 102 includes a plurality of base stations 116, for communicating with the portable portion 104, utilizing conventional techniques well known in the art, and coupled by communication links 114 to a controller 112 which controls the base stations 116. The hardware of the controller 112 is preferably a combination of the Wireless Messaging Gateway (WMG™) Administrator!™ paging terminal and the RF-Conductor!® message distributor manufactured by Motorola, Inc. The hardware of the base stations 116 is preferably a combination of the Nucleus® RF-Orchestra!™ transmitter and RF-Audience!™ receivers manufactured by Motorola, Inc. It will be appreciated that other similar hardware can be utilized as well for the controller 112 and base stations 116.

Each of the base stations 116 transmits radio signals to the portable portion 104 comprising a plurality of portable communication devices 122 via a transmitting antenna 120. The base stations 116 each receive radio signals from the plurality of portable communication devices 122 via a receiving antenna 118. The radio signals comprise selective call addresses and messages transmitted to the portable communication devices 122 and acknowledgments received from the portable communication devices 122. It will be appreciated that the portable communication devices 122 can also originate messages other than acknowledgments, as will be described below. The controller 112 preferably is coupled by telephone links 101 to a public switched telephone network (PSTN) 110 for receiving selective call originations therefrom. Selective call originations comprising voice and data messages from the PSTN 110 can be generated, for example, from a conventional telephone 124 coupled to the PSTN 110 in a manner that is well known in the art.

Data and control transmissions between the base stations 116 and the portable communication devices 122 preferably utilize a protocol similar to Motorola's well-known FLEX™ digital selective call signaling protocol. This protocol utilizes well-known error detection and error correction techniques and is therefore tolerant to bit errors occurring during transmission, provided that the bit errors are not too numerous in any one code word.

Outbound channel transmissions comprising data and control signals from the base stations 116 preferably utilize two and four-level frequency shift keyed (FSK) modulation, operating at sixteen-hundred or thirty-twohundred symbols-per-second (sps), depending on traffic requirements and system transmission gain. Inbound channel transmissions from the portable communication devices 122 to the base stations 116 preferably utilize four-level FSK modulation at a rate of ninety-six-hundred bits per second (bps). Inbound channel transmissions preferably occur during predetermined data packet time slots synchronized with the outbound channel transmissions. It will be appreciated that, alternatively, other signaling protocols, modulation schemes, and transmission rates can be utilized as well for either or both transmission directions. The outbound and inbound channels preferably operate on a single carrier frequency utilizing well-known time division duplex (TDD) techniques for sharing the frequency. It will be further appreciated that, alternatively, the outbound and inbound channels can operate on two different carrier frequencies using frequency division multiplexing (FDM) without requiring the use of TDD techniques.

U.S. Pat. No. 4,875,038 to Siwiak et al., which describes a prior art acknowledge-back radio communication system, is hereby incorporated herein by reference. For further information on the operation and structure of an acknowledge-back radio communication system, please refer to the Siwiak et al., patent.

Figure 2:
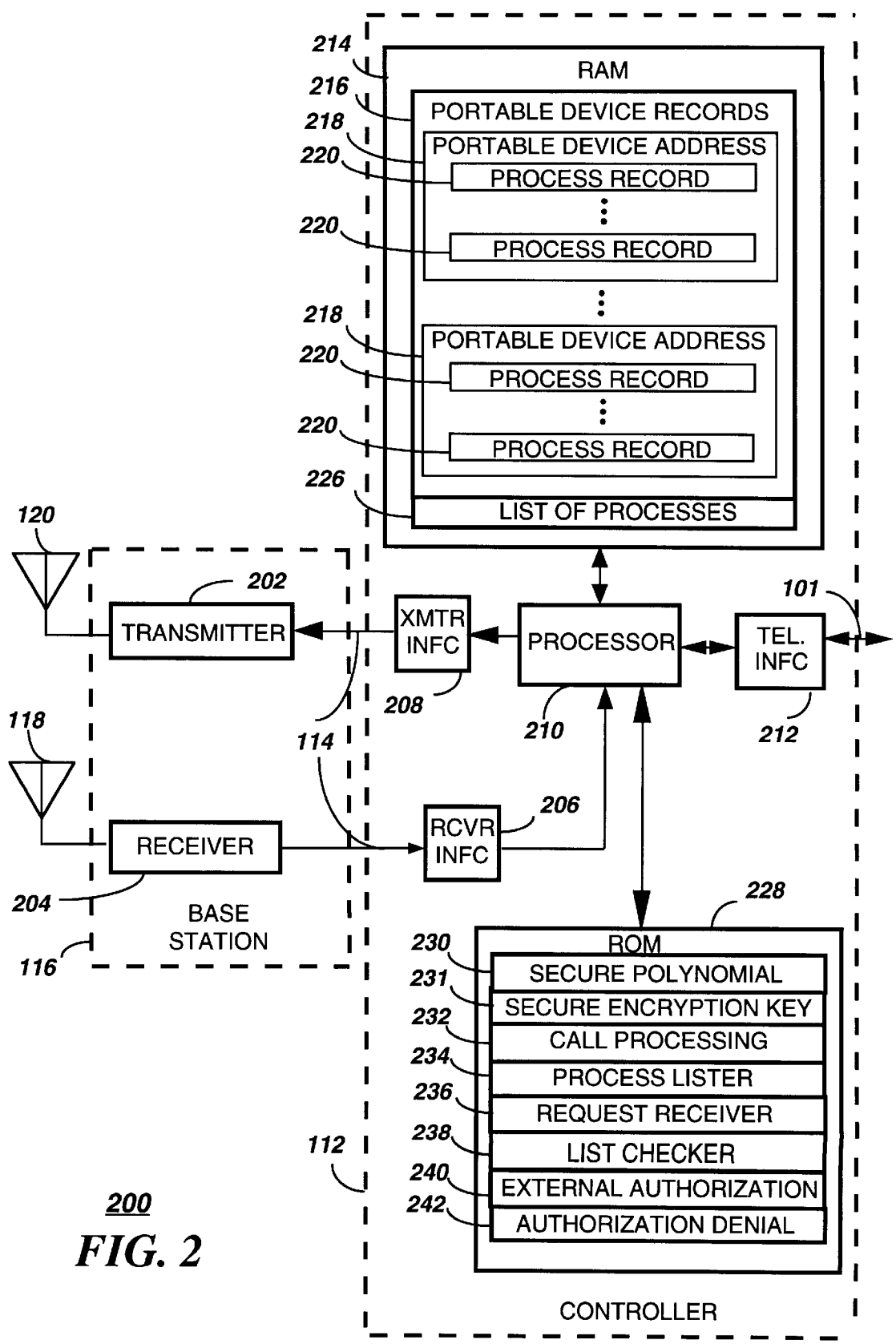
FIG. 2 is an electrical block diagram of elements of a fixed portion of the communication system in accordance with the preferred embodiment of the present invention.

Referring to FIG. 2, an electrical block diagram of elements 200 of the fixed portion 102 in accordance with the preferred embodiment of the present invention comprises portions of the controller 112 and the base stations 116. The controller 112 comprises a processor 210 for directing operation of the controller 112. The processor 210 preferably is coupled through a transmitter interface 208 to a transmitter 202 via the communication links 114. The communication links 114 use conventional means well known in the art, such as a direct wire line (telephone) link, a data communication link, or any number of radio frequency links, such as a radio frequency (RF) transceiver link, a microwave transceiver link, or a satellite link, just to mention a few. The transmitter 202 transmits two and four-level FSK data messages to the portable communication devices 122. The processor 210 is also coupled to at least one receiver 204 through a receiver interface 206 via the communication links 114. The receiver 204 demodulates four level FSK and can be collocated with the base stations 116, as implied in FIG. 2, but preferably is positioned remote from the base stations 116 to avoid interference from the transmitter 202. The receiver 204 is for receiving one or more acknowledgments and/or messages from the portable communication devices 122.

The processor 210 is coupled to a telephone interface 212 for communicating with the PSTN 110 through the telephone links 101 for receiving selective call originations. The processor 210 is also coupled to a random access memory (RAM) 214 comprising a database of portable device records 216 and a database of processes 226. The database of portable device records 216 contains, as a minimum, a list of process records 220 for each portable communication device 122. To access the list of process records 220 of a portable communication device 122, a portable device address 218 corresponding to the address of a portable communication device 122 is used to search the database of portable device records 216. The list of process records 220 specifies the software and hardware processes which are authorized for use by a portable communication device 122 having the portable device address 218. Each process record 220 contains a list of process verification elements used for process authorization of external authorization requests transmitted by the portable communication devices 122, as will be described below. The verification elements contained in the process record 220 for both hardware and software processes include a process name, a process size and a secure cyclic redundancy check (CRC).

The database of processes 226 preferably comprises binary executables (machine code) of many of the authorized software processes available for use by the portable communication devices 122. The software processes stored in the RAM 214 of the controller preferably can be delivered to portable communication devices 122 by way of over-the-air (OTA) programming utilizing techniques well known in the art.

The processor 210 also is coupled to a read-only memory (ROM) 228. It will be appreciated that other types of memory, e.g., electrically erasable programmable ROM (EEPROM) or magnetic disk memory, can be utilized for the ROM 228, as well as the RAM 214. It will be further appreciated that the RAM 214 and the ROM 228, singly or in combination, can be integrated as a contiguous portion of the processor 210. Preferably, the processor 210 is similar to the DSP56100 digital signal processor (DSP) manufactured by Motorola, Inc. It will be appreciated that other similar processors can be utilized for the processor 210, and that additional processors of the same or alternate type can be added as required to handle the processing requirements of the controller 112.

The first two elements in the ROM 228 include a secure polynomial 230 and a secure encryption key 231. The secure polynomial 230 is used as a secure polynomial generator for CRC verification of process executables requested by external authorization request messages transmitted by portable communication devices 122. The portable communication devices 122 use the same secure polynomial generator for CRC generation. Using the same secure polynomial generator for both the fixed portion 102 and portable portion 104 of the communication system provides a means for verifying authenticity of software and hardware processes requested by the portable communication devices 122. The secure encryption key 231 is used for encryption and decryption of authorization messages transmitted between the portable communication devices 122 and the base stations 116. Similarly, the portable communication devices 122 use the same secure encryption key for external authorization message transactions. Using secure encryption between the fixed portion 102 and the portable portion 104 of the communication system provides a method for transmitting secure two-way messages which are unlikely to be breached. The encryption process converts an unscrambled sequence to a pseudo-random sequence coded by a scrambler and decoded by a descrambler. The scrambler and descrambler use preferably polynomial generators with feedback paths which use modulo 2 (Exclusive Or) addition on the feedback taps. The descrambler uses the same architecture as the scrambler for descrambling the message. Using a nonlinear feedback shift register (NFSR) architecture provides a secure approach for message encryption which makes it difficult, if not computationally intractable for a person to decipher the encryption key. The present invention preferably uses a conventional self-synchronizing stream encryption system which utilizes a NFSR architecture, as is well known by one of ordinary skill in the art. It will be appreciated that, alternatively, other methods which provide suitably secure encryption can be used. It will be further appreciated that, alternatively, message transactions between the base stations 116 and the portable communication devices 122 can be non-encrypted.

To protect against unauthorized access, the secure polynomial 230 and the secure encryption key 231 preferably are stored in a secure portion of the ROM 228 which can only be accessed by the processor 210. Preferably, this portion of the ROM 228 is integrated with the processor 210 as a protected mask read only memory (MROM), and is programmed during the manufacturing process of the processor 210. As is well known by one of ordinary skill in the art, once a protected MROM has been programmed the protected portion of the MROM is only accessible by the processor 210 and cannot be accessed by external hardware coupled to the processor 210. Alternatively, the secure polynomial 230 and the secure encryption key 231 can be included in a re-programmable non-volatile memory such as a FLASH memory, an EEPROM memory or magnetic disk memory, but accessibility of the secure polynomial 230 and secure encryption key 231 are preferably restricted by the service provider to authorized personnel only. Using re-programmable non-volatile memories provides flexibility of adding more polynomial elements and encryption keys for system and subscriber unit expansion.

The ROM 228 of the processor 210 also includes firmware elements for use by the processor 210. The firmware elements include a call processing element 232, a process lister element 234, a request receiver element 236, a list checker element 238, an external authorization element 240 and an authorization denial element 242. The call processing element 232 handles the processing of an incoming call for a called party and for controlling the transmitter 202 to send a selective call message to the portable communication device 122 corresponding to the called party, utilizing techniques well known in the art. The process lister element 234 manages the database of portable device records 216 stored in the RAM 214 for each portable communication device 122 utilizing database management techniques well known in the art. The request receiver element 236 processes encrypted external authorization request messages received by the receiver 204 of the base station 116 and originating from the portable communication devices 122. The encrypted external authorization request message is decrypted with the secure encryption key 231 described above. The external authorization request for hardware and software processes comprises at least a process name and a process size corresponding to the process, along with a secure checksum and an address identifying the portable communication device 122. Optionally, an authorization request command can accompany the external authorization request message. Preferably, the authorization request command is included in the address portion of the portable communication device 122 address. Alternatively, the authorization request command can be in a separate element in the external authorization request message. The secure checksum is preferably a secure CRC of the software process for which the portable communication device 122 is requesting authorization. The CRC is generated by the portable communication device 122 by using a polynomial generator stored in its memory, which is the same as the secure polynomial 230 used by the controller 112, as described above. The secure checksum provides a means for verifying that the process being used by the portable communication device 122 is an authorized version. The list checker element 238 uses the address, corresponding to the portable communication device 122, received in the external authorization request message as a portable device address 218. The processor 210, as described above, searches through the database of portable device records 216 to find the list of process records 220 corresponding to the portable device address 218 matching the address of the portable communication device 122. The list checker element 238 then checks each process record 220 for a match to the process name, process size and secure CRC received in the external authorization request message. If a match is found, then authorization is given to the portable communication device 122 for using the requested software or hardware process. If a match is not found, then authorization is denied. When the list checker element 238 authorizes a process requested by the portable communication device 122, the processor 210 calls on the external authorization element 240 to process the external authorization response message to be transmitted to the portable communication device 122. The external authorization response message preferably comprises an authorization command, the process name of the authorized process and an expiration time for the process. It will be appreciated that, alternatively, the external authorization response message can include a plurality of process names and expiration times authorizing a plurality of processes requested by the portable communication device 122. Before the external authorization element 240 sends the external authorization response message to the transmitter 202 of the base station 116, the external authorization response message is encrypted, using the method described above, to secure the RF transmission of the message. When the list checker element 238 denies authorization of a process to a portable communication device 122, the processor 210 calls on the authorization denial element 242 to process the external authorization denial response message to be transmitted to the portable communication device 122. The external authorization denial response message comprises an authorization command which includes a "not authorized" signal denying authorization, and a process name of the process being denied. It will be appreciated that the external authorization denial response message can include a plurality of process names denying authorization to a plurality of processes requested by the portable communication device 122. As is done with the external authorization response message, the external authorization denial response message is encrypted before it is transmitted to the portable communication device 122 by the base stations 116.

According to an auditing operation of the fixed portion 102, the processor 210 is programmed by way of the ROM 228 to periodically audit the portable communication device 122 through a radio channel of the communication system to determine a catalog of internal authorizations 382 (FIG. 3) stored in the portable communication device 122. In addition, the processor 210 is programmed to periodically audit the portable communication device 122 through a radio channel of the communication system to determine a quantitative usage of each of the processes 398 (FIG. 3) used by the portable communication device 122, and to bill a user of the portable communication device 122 in response to the quantitative usage determined. The processor 210 is also programmed by way of the ROM 228 to maintain a list of authorized processes 398 in the process records 220 corresponding to the portable communication device 122, and to compare the catalog of internal authorizations 382 with the list of authorized processes 398 corresponding to the portable communication device to determine whether any of the internal authorizations 382 stored in the portable communication device 122 are invalid. The processor 210 is further programmed by way of the ROM 228 to store an indication in a user database entry (not shown) in the RAM 214 corresponding to the portable communication device 122 that an invalid internal authorization 382 has been found therein, in response to determining that at least one of the internal authorizations 382 stored in the portable communication device 122 is invalid. The processor 210 is also programmed to transmit a command to the portable communication device 122 to delete at least one of the internal authorizations 382, in response to determining that the at least one of the internal authorizations 382 stored in the portable communication device 122 is invalid. These operational features will be described further herein below.

According to a message sending operation of the fixed portion 102, the processor 210 is programmed by way of the ROM 228 to queue a message for transmission to the portable communication device 122, the message requiring a predetermined process 398 in the portable communication device 122 in order to process the message. In addition, the processor 210 is programmed to determine that the portable communication device 122 does not have a predetermined usage authorization 382 for utilizing the predetermined process 398; and in response, to grant the predetermined usage authorization 382 to the portable communication device 122 through the radio channel of the communication system (after verifying, for example, that the account of the user of the portable communication device 122 is in good standing). Preferably, the processor 210 determines that the portable communication device 122 does not have the predetermined usage authorization 382 by auditing the portable communication device 122 over the radio channel. It will be appreciated that, alternatively, the processor 210 can determine from its own internal process records 220 that the portable communication device 122 has not been previously authorized for utilizing the predetermined process 398.

If the predetermined process 398 is a software process, the processor 210 is further programmed to determine that the portable communication device 122 does not have the software process, e.g., by receiving from the portable communication device 122 a request for the software process; and in response, to download the software process to the portable communication device 122 through the radio channel. Preferably, before downloading the software process, the processor 210 is further programmed to transmit terms of a licensing agreement to the portable communication device 122, to receive from the portable communication device 122 a reply indicating whether the user of the portable communication device 122 agrees to the terms, and to omit downloading of the software process in response to the reply indicating that the user does not agree to the terms of the licensing agreement. These operational features will be described further herein below.

Figure 3:
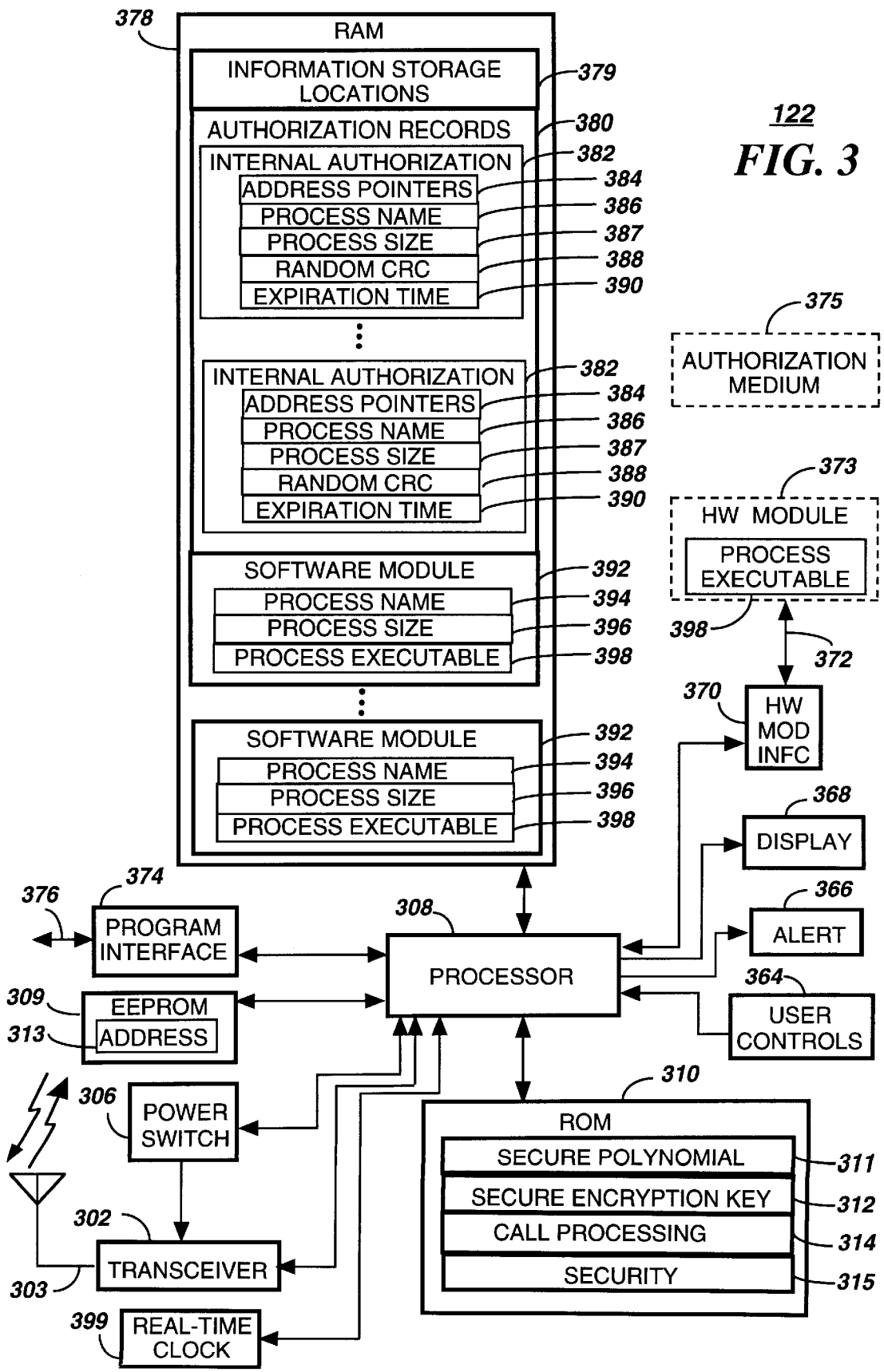
FIGS. 3 and 4 are elements of an electrical block diagram of a portable communication device in accordance with the preferred embodiment of the present invention.

Referring to FIG. 3, an electrical block diagram of the portable communication device 122 in accordance with the preferred embodiment of the present invention comprises a transceiver antenna 303 for transmitting radio signals to the base stations 116 and for intercepting radio signals from the base stations 116. The transceiver antenna 303 is coupled to a transceiver 302 utilizing conventional techniques well known in the art. The radio signals received from the base stations 116 use conventional two and four-level FSK. The radio signals transmitted by the portable communication device 122 to the base stations 116 use fourlevel FSK.

Radio signals received by the transceiver 302 produce demodulated information at the output. The demodulated information is coupled to the input of a processor 308, which processes the information in a manner well known in the art. Similarly, inbound response messages are processed by the processor 308 and delivered to the transceiver 302 which is coupled to the processor 308. The response messages transmitted by the transceiver 302 are preferably modulated using four-level FSK.

A conventional power switch 306, coupled to the processor 308, is used to control the supply of power to the transceiver 302, thereby providing a battery saving function. The processor 308 is coupled to a random access memory (RAM) 378 for storing messages in information storage locations 379. The RAM 378 further comprises authorization records 380 and software modules 392. The authorization records 380 include internal authorization records 382 of processes, either software or hardware, which have been authorized for use by the portable communication device 122. The software modules 392 include a process name 394, a process size 396 and a process executable 398. The internal authorization record 382 is encrypted using a secure encryption key 312 stored in a read only memory (ROM) 310 of the portable communication device 122. The encryption key used is the same as that used by the controller 112 described above. The internal authorization record 382 for hardware and software processes comprises address pointers 384, a process name 386, a process size 387, a random CRC 388 of the authorized hardware or software process executable 398 and an expiration time 390. The address pointers 384 preferably include two address pointers which point to two byte locations within the process executable 398 of the authorized hardware or software process. The two bytes are chosen by a random process which preferably uses a real-time clock 399 for generating random address pointers. The real-time clock 399 determines time (in hours, minutes and seconds) and calendar date, which is also used for determining the expiration time of a process, as will be described below. To determine the two random address pointers the real-time clock 399 is used in conjunction with the random event of the user requesting use of a process through the user controls 364. When the user depresses a button on the user controls 364 requesting execution of a process, the processor 308 reads the time specified by the real-time clock 399. The real-time clock 399 reading is in binary format and is sufficiently long to cover a wide address spectrum. Depending on the number of bytes contained in the process executable 398 the user is requesting, a limited number of bits are chosen in the real-time clock reading to cover the size of the process executable 398. The limited real-time clock reading is then used as an address pointer to a first random byte in the requested process executable 398. The second random address pointer points to a second random byte location. The two bytes together represent a 16 bit polynomial generator seed for generating the random CRC 388 of the hardware or software process executable 398. As is well known by one of ordinary skill in the art, a polynomial generator must follow certain guidelines such as, for example, the polynomial generator must not contain all zeros or all ones. When the two bytes chosen violate any polynomial generator rules, the address pointers are moved to a next higher location in the process executable 398. If the end of the process executable 398 is reached then the random address pointers wrap around to the beginning of the process executable 398. This process continues until a valid set of bytes are chosen which meet the polynomial generator rules. It will be appreciated that, alternatively, more than two bytes can be used for the random polynomial generator. The expiration time 390 includes a date, and optionally a time when the authorization of the hardware or software process expires. Whenever a process execution is requested by the user, the expiration time 390 is compared to the real-time clock 399 to determine if authorization of the hardware or software process has expired. It will be appreciated that reprogrammable non-volatile memory devices, such as, for example, EEPROM or FLASH memories, can be used to prevent loss of the authorization records 380 stored in the RAM 378 during a power outage.

The processor 308 is also coupled to a programming interface 374 and a hardware module interface 370. The programming interface 374 allows for external software module download into the RAM 378. The programming interface 374 preferably uses a serial communication interface 376 for communication with the processor 308. The serial interface preferably uses a conventional universal asynchronous receiver transmitter (UART) well known in the art. The physical means for the interface preferably uses metal contacts. It will be appreciated that, alternatively, other physical means can be used, such as infrared, inductive coupling, etc. The hardware module interface 370 allows for attachments of hardware modules to the portable communication device 122. The hardware module interface 370 preferably uses a hardware interface 372, well known in the art, such as the Personal Computer Memory Card International Association (PCMCIA) interface. With this interface any type of hardware module 373 conforming to the PCMCIA standard can be attached to the portable communication device 122. The function of the hardware module 373 can include any number of functions such as a software module hardware accelerator, video graphics card, expanded memory card, etc. It will be appreciated that the programming interface 374 and the hardware module interface 370 can use other interfaces for software download and hardware attachments, well known in the art.

The ROM 310 coupled to the processor 308 comprises a secure polynomial 311, a secure encryption key 312 and firmware elements for use by the processor 308. It will be appreciated that other types of memory, e.g., EEPROM, can be utilized as well for the ROM 310. The secure polynomial 311 includes a secure polynomial generator for CRC generation of hardware and software process executables 398. The secure polynomial 311 used by the portable communication device 122 matches the secure polynomial 230 used by the controller 112 described above. The secure encryption key 312 is used for scrambling and descrambling external authorization messages transmitted between the portable communication device 122 and the base stations 116. The secure encryption key 312 used by the portable communication device 122 matches the secure encryption key 231 used by the controller 112. The secure polynomial 311 and secure encryption key 312 are stored in a protected portion of the ROM 310 utilizing the techniques described for the controller 112.

The firmware elements comprise a call processing element 314 which handles incoming messages on the outbound channel using techniques well known in the art. When an address is received by the processor 308, the call processing element 314 compares one or more addresses 313 stored in an EEPROM 309, and when a match is detected, a call alerting signal is generated to alert a user that a message has been received. The call alerting signal is directed to a conventional audible or tactile alerting device 366 for generating an audible or tactile call alerting signal. In addition, the call processing element 314 processes the message which is received in a digitized conventional manner and then stores the message in one of the information storage locations 379 in the RAM 378. The message can be accessed by the user through user controls 364, which provide functions such as lock, unlock, delete, read, etc. More specifically, by the use of appropriate functions provided by the user controls 364, the message is recovered from the RAM 378, and then displayed on a display 368, e.g., a conventional liquid crystal display (LCD).

Figure 4:
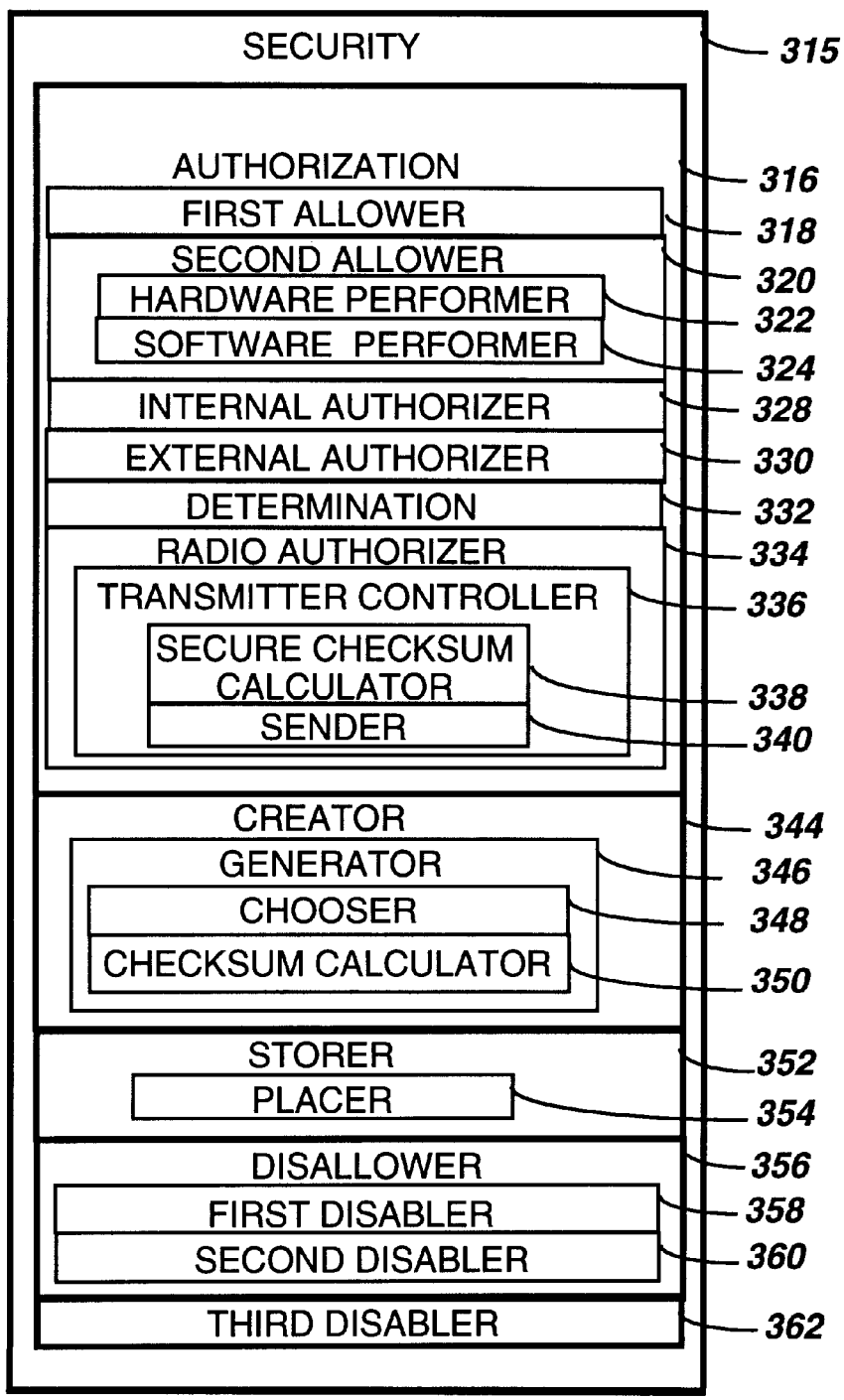

The firmware elements further comprise a security element 315 for processing authorization of software modules 392 and hardware modules 373. The elements contained in the security element 315 are shown in FIG. 4. The security element 315 includes an authorization element 316, a second allower element 320, a creator element 344, a storer element 352, a disallower element 356 and a third disabler element 362. When a user requests utilization of a hardware or software process by the use of appropriate functions provided by the user controls 364, the processor 308 calls on the authorization element 316 to process the request. The processor 308 begins the authorization process by invoking a first allower element 318 which, optionally, allows immediate utilization of the process requested. Whether or not the first allower element 318 allows immediate utilization of a process is determined by programming of the portable communication device 122 performed by the system provider. The processor 308 follows by invoking a determination element 332 which is used for making a determination of whether an internal authorization record 382 exists for utilizing the hardware or software process. The determination of a valid internal authorization record 382 is made by searching through the authorization records 380 for a process name 386 which matches the module name of the hardware or software process requested by the user. If a match is determined, then an internal authorizer element 328 is called on by the processor 308 to read the address pointers 384 to determine the random polynomial generator to be used for random CRC generation over the process executable 398 of the hardware or software module. The internal authorizer element 328 uses the process size 387 corresponding to the module size of the hardware or software process executable 398 to calculate a random CRC over the process executable 398 of the hardware or software process. If the CRC generated matches the random CRC 388 stored in the internal authorization record 382, then the processor 308 invokes the second allower element 320 to check the expiration time 390 against the real-time clock 399. If the expiration time has not expired, then the processor 308 allows the utilization of the process, in response to the usage authorization being obtained. However, if the expiration time has expired then the processor 308 calls on the third disabler element 362 for disabling further utilization of the process in response to an expiration of the usage authorization.

If the determination element 332 does not find an internal authorization record 382 for the hardware or software process requested by the user, then a radio authorizer element or authorizer element 334 is called on for communicating with the fixed portion 102 by sending a signal indicative of the hardware or software module to obtain the usage authorization as an external authorization, in response to the internal authorization being absent from the authorization records 380. The radio authorizer element 334 attempts to obtain the usage authorization through a first radio channel (the inbound channel) of the communication system. If the external authorization request is denied, then the processor 308 calls on a first disabler element 358 to disable further utilization of the process, in response to receiving a "not authorized" signal through a second radio channel (the outbound channel) of the communication system. If the external authorization request is not received within a predetermined time interval, then the processor 308 invokes a second disabler element 360 to disable utilization of the process requested by the user. To create the external authorization request message, the radio authorizer element 334 invokes a transmitter controller element 336. The transmitter controller element 336 calls on a secure checksum calculator element 338 which uses the secure polynomial 311 stored in the ROM 310 to calculate a secure CRC over the process executable 398 of the hardware or software process requested by the user. Once the secure CRC is determined, the processor 308 prepares an external authorization request message comprising an authorization request command, the address of the portable communication device 122, the process name, the size of the hardware or software process executable 398, and the secure CRC calculated by the secure checksum calculator element 338. Once the external authorization request message has been determined the transmitter controller element 336 encrypts the message with the secure encryption key 312. The processor 308 then invokes a sender element 340 and sends the message to the transceiver 302, which thereafter transmits the encrypted external authorization request message to the base stations 116. If an encrypted external authorization response message is received from the base stations 116 indicating the hardware or software process is authorized, then the processor 308 accesses a second allower element 320 to process the message. If the external authorization response message was for a hardware module 373 authorizing utilization of the process, then the second allower element 320 invokes a hardware performer element 322 for performing the process in accordance with circuits of the hardware module 373. If the external authorization response message was for a software module 392 authorizing utilization of the process, then the second allower element 320 invokes a software performer element 324 for performing the process in accordance with instructions of the software module 392.

For software modules 392 or hardware modules 373 which are user-installed, an authorization medium 375 (preferably a registration form with proof of purchase) is physically sent to the service provider to obtain authorization. When the user requests execution of the installed process, the process is optionally executed and the processor 308 invokes the external authorizer element 330 to request an external authorization from the controller 112. The external authorizer element 330 obtains usage authorization by receiving an external authorization from the service provider through a radio channel (the outbound channel) of the communication system. The external authorization request message sent to the base stations 116, as described above, comprises an authorization request command, the portable communication device 122 address, the process name and size, and a secure CRC of the hardware or software process executable 398. When the controller 112 sends an authorization message granting authorization of the hardware or software process, the second allower element 320 allows the utilization of the process, in response to the usage authorization being obtained. In response to obtaining an external authorization allowing utilization of a process, the processor 308 accesses the creator element 344 to create an internal authorization record 382. To create the internal authorization record the processor 308 invokes a generator element 346 which first calls on a chooser element 348 to select preferably two random bytes of the hardware or software process executable 398. The random bytes are preferably chosen using the real-time clock 399 and user invocation of the user controls 364 as described above. Once the random bytes have been determined, and satisfy the polynomial generator rules, a checksum calculator element 350 is invoked to perform a CRC generation on the process executable 398 of the hardware or software module. Once the random CRC 388 has been calculated, the storer element 352 collects the verification elements used for the internal authorization record 382. The verification elements comprise the address pointers 384 for the random polynomial generator, the process name 386, the random CRC 388 calculated by the checksum calculator element 350 and the expiration time 390 received in the external authorization message from the controller 112. The processor 308 then calls on a placer element 354 which uses the secure encryption key 312 to encrypt the verification elements and then stores the result in the authorization records 380 in the RAM 378.

For cooperation with the auditing operation of the fixed portion 102, the processor 308 is programmed by way of the ROM 310 to maintain in the RAM 378 a record (not shown) of usage of the process 398, and to report the usage in response to receiving a usage audit command from the fixed portion 102 of the communication system. In addition, the processor 308 is programmed to maintain the record of internal authorizations 382 present within the portable communication device 122 for utilizing the processes 398, and to report the internal authorizations 382 present, in response to receiving an internal authorization audit command from the fixed portion 102 of the communication system. The processor 308 is also programmed to delete an internal authorization 382, in response to receiving a delete authorization command directed at the internal authorization 382 from the fixed portion 102 of the communication system. These operational features will be described further herein below.

For cooperation with the message sending operation of the fixed portion 102, the processor 308 is programmed by way of the ROM 310 to control the transceiver 302 to request a download of a predetermined software process 398 in response to receiving from the fixed portion 102 a message that requires the predetermined software process 398 for processing the message. In addition, the processor 308 is programmed by way of the ROM 310 to control the display 368 to display the terms of a software license agreement, in response to receiving the terms of the software license agreement from the fixed portion 102 through the radio channel.

Figure 5:
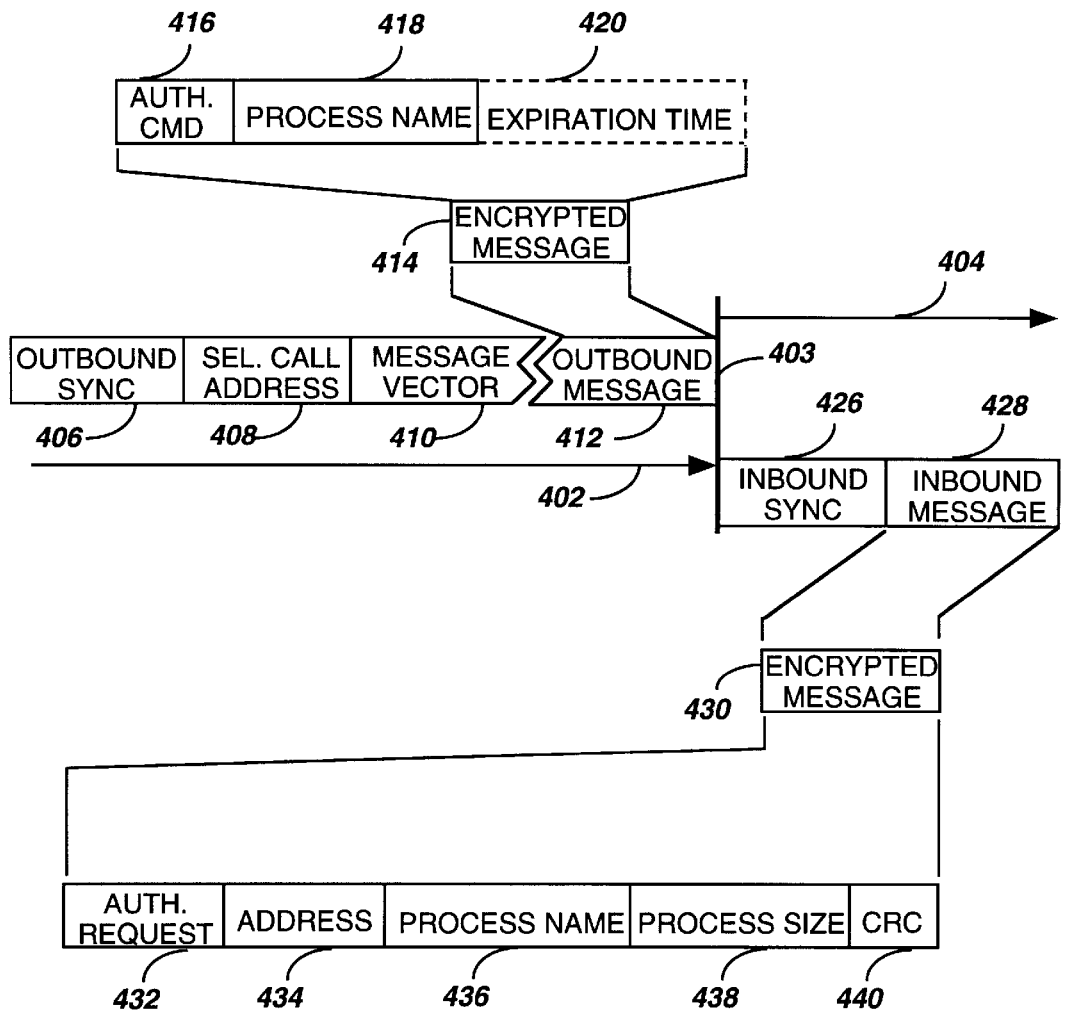
FIG. 5 is a timing diagram of elements of an outbound protocol and an inbound protocol of the fixed and portable portions of the communication system in accordance with the preferred embodiment of the present invention.

Referring to FIG. 5, a timing diagram 400 depicts elements of an outbound protocol and an inbound protocol of the fixed portion 102 and portable portion 104 of the communication system in accordance with the preferred embodiment of the present invention. The signaling format on the outbound and inbound channels preferably operates on a single carrier frequency utilizing well-known time division duplex (TDD) techniques for sharing the frequency. It will be appreciated that the outbound and inbound channels can use separate frequency channels utilizing frequency division multiplexing (FDM) techniques well known in the art. Using TDD transmission the outbound RF channel transmission is depicted during an outbound transmission time interval 402, while the inbound RF channel transmission is depicted during an inbound transmission time interval 404. The outbound transmission time interval 402 and the inbound transmission time interval 404 are subdivided by a time boundary 403. The time boundary 403 depicts a point in time when the outbound transmissions cease and the inbound transmissions commence.

The elements of the outbound protocol comprise an outbound sync 406, a selective call address 408, a message vector 410 and an outbound message 412, while the inbound protocol comprises an inbound sync 426 and an inbound message 428. The outbound sync 406 provides the portable communication device 122 a means for synchronization utilizing techniques well known in the art. The selective call address 408 identifies the portable communication device 122 for which the outbound message 412 is intended. The message vector 410 points in time within the TDD signal format to the position of the outbound message 412 to be received by the portable communication device 122. The outbound message 412 can be either a well known selective call message, or an external authorization response message in accordance with the present invention. When the outbound message 412 is an external authorization response message, the message received by the portable communication device 122 is an encrypted message 414. The encrypted message 414 comprises an authorization command 416, a process name 418 and, optionally, an expiration time 420. When the authorization command 416 is an authorization command denying authorization for utilization of a requested process, then the expiration time 420 is not included in the encrypted external authorization response message. It will be appreciated that the outbound external authorization response message can be extended to include multiple authorizations and/or denials by sending a plurality of authorization commands 416, associated process names 418 and, optionally, expiration times 420.

Similarly, the inbound sync 426 provides the base stations 116 a means for synchronization utilizing techniques well known in the art. The inbound message 428 can be either a well known acknowledge-back response message, or an external authorization request message in accordance with the present invention. When the inbound message 428 is an external authorization request message, the message transmitted by the portable communication device 122 is an encrypted message 430. The encrypted message 430 comprises an authorization request command 432, an address 434 corresponding to the portable communication device 122, a process name 436, a process size 438 and a secure CRC 440. The secure CRC is determined, as described above, using the secure polynomial 311 over the hardware or software module's process executable 398. It will be appreciated that the authorization request command 432 can be included as part of the field of the address 434. It will also be appreciated that multiple authorization requests can be included within the same inbound message by sending a plurality of process names 436 and process sizes 438 with their associated secure CRCs 440.

During selective call messaging between the base stations 116 and the portable communication devices 122, the communication system protocol described above begins with an outbound message which delivers a message to a portable communication device 122. The portable communication device 122 can, optionally, acknowledge reception of the message on the inbound channel. Acknowledgment messages from the portable communication device 122 are transmitted on the inbound channel during a scheduled period which is referenced to the time boundary 403 described above. Scheduled inbound messages are preferably reserved for acknowledgment messaging from the portable communication devices 122. However, when a user invokes a process which requires transmitting an external authorization request message to the base stations 116, the portable communication device 122 uses an unscheduled time period (slot) referenced to the time boundary 403 for unscheduled messaging to the base stations 116. Note that during inbound messaging, a time period referenced to the time boundary 403 is reserved for both scheduled and unscheduled inbound messages. Therefore, there is no contention between scheduled and unscheduled inbound messages. Since the number of unscheduled time slots is limited, it is possible for contention to exist among a plurality of portable communication devices 122 transmitting unscheduled inbound messages. To resolve contention with unscheduled inbound messages, the present invention preferably utilizes ALOHA protocol as is well known by one of ordinary skill in the art.

When the preferred embodiment of the present invention is acquiring authorization of hardware and software modules remotely as just described, it will be appreciated that message transactions originate first from the portable communication device 122 as unscheduled inbound messages. Subsequent responses from the fixed portion 102 of the communication system are received on the outbound channel. When the preferred embodiment of the present invention is performing auditing and message sending operations of the fixed portion 102, it will be appreciated that the message transactions originate first from the fixed portion 102 as outbound messages, with subsequent responses from the portable communication device 122 received on the inbound channel, as described further herein below. It will be further appreciated that, alternatively, other communication protocols which support two-way communication can be used.

Figure 6:
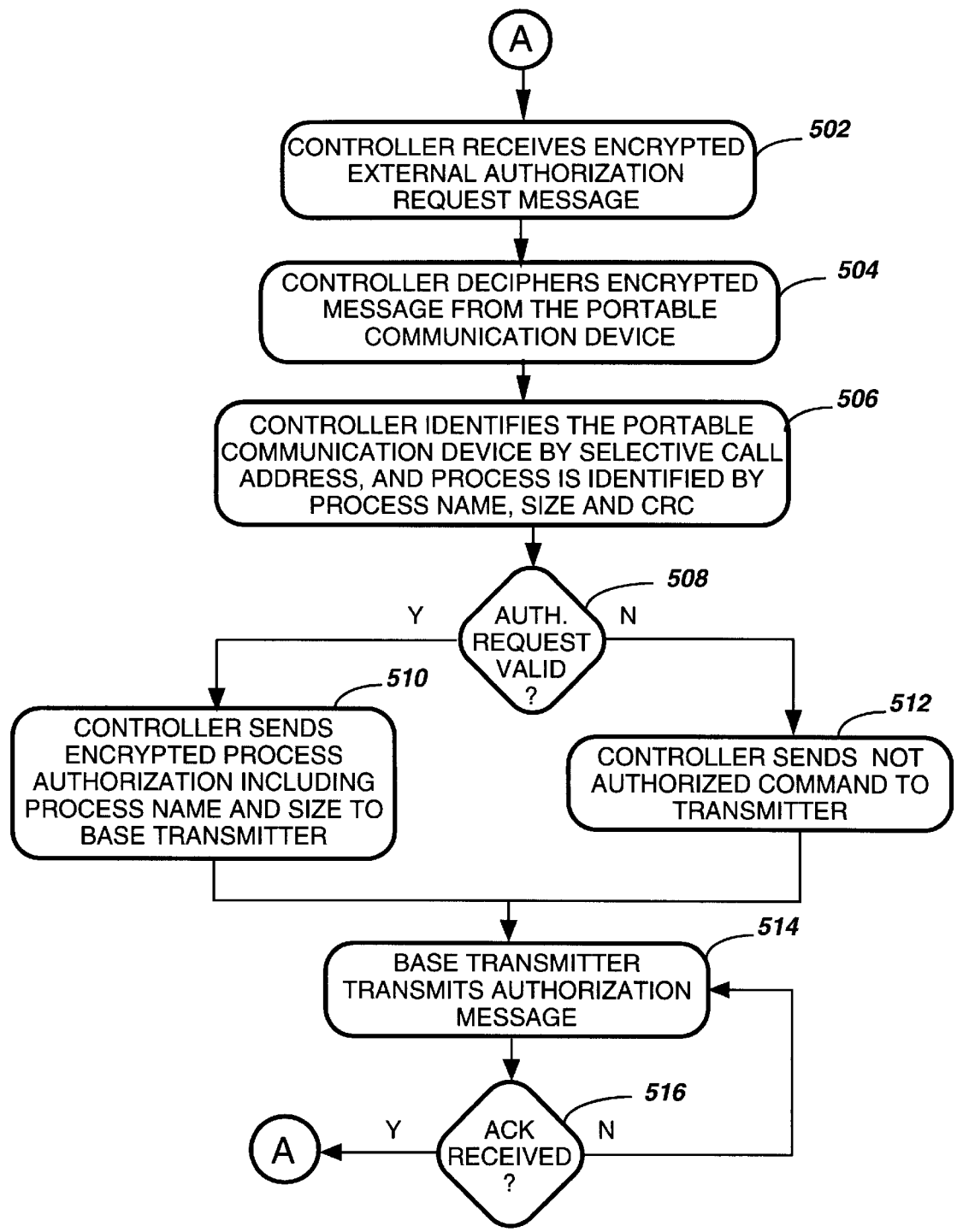
FIG. 6 is a flow chart depicting an authorization operation of the fixed portion in response to a message originated by the portable communication device in accordance with the preferred embodiment of the present invention.

Referring to FIG. 6, a flow chart 500 depicting an authorization operation of the fixed portion 102 in response to a message originated by the portable communication device 122 in accordance with the preferred embodiment of the present invention begins with step 502 where the controller 112 receives an encrypted external authorization request message. In step 504 the controller 112 deciphers the encrypted message using the secure encryption key 231 stored in the ROM 228. In step 506 the controller 112 identifies the portable communication device 122 requesting the authorization by the address 434 received. Additionally, the controller 112 reads the process verification elements included in the external authorization request message. In step 508 the controller 112 checks for a match between the process verification elements received and the list of process records 220 corresponding to the portable communication device 122. If a match is found, then in step 510 an external authorization response message is constructed authorizing utilization of the process. The external authorization response message comprising the authorization command 416 allowing utilization of the process, the process name 418 of the process authorized and an expiration time 420 for the process. Before sending the message to the base stations 116 for transmission, the external authorization response message is encrypted using the secure encryption key 231 as described above. When a match is not found, then in step 512 an external authorization response message with an "authorization denied" command is constructed. The external authorization response message then comprises the authorization command 416 for denying authorization to the requested process, and the associated process name 418. The denial message, as described above, is encrypted by the controller 112 using the secure encryption key 231. Once either type of the external authorization response message is constructed, then in step 514 the message is sent to the transmitter 202 of the base station 116 where it is transmitted to the portable communication device 122. In step 516 the controller 112 checks for a message acknowledgment response from the portable communication device 122 acknowledging reception of the external authorization response message. If no acknowledgment is received, then the controller 112 resends the message in step 514. The controller 112, preferably, has an option to limit the number of re-transmissions by using, for example, a maximum resend count programmed by the system provider. Once an acknowledgment is received, the controller 112 returns to step 502 where it processes subsequent external authorization request messages from the portable communication devices 122.

Figure 7:
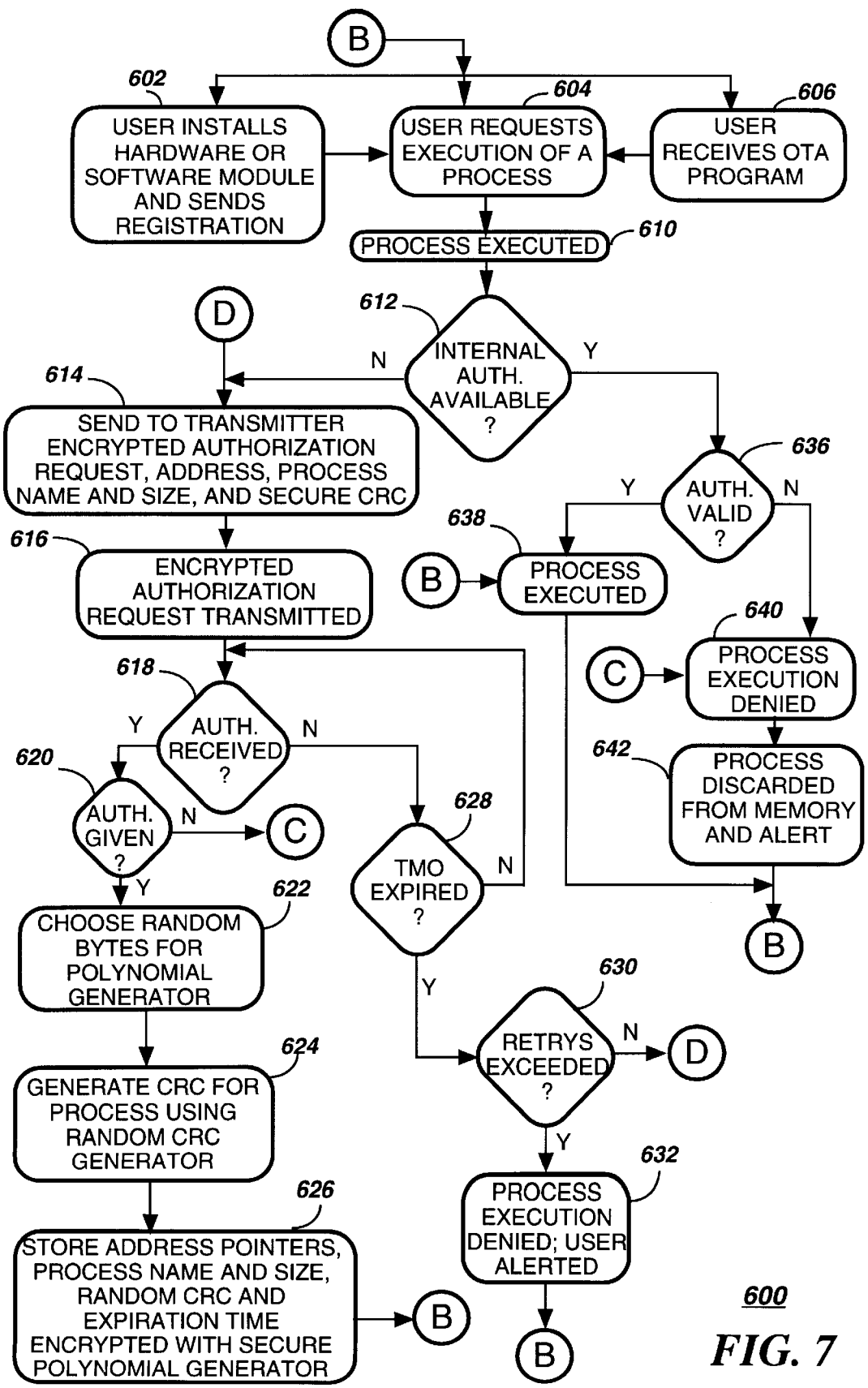
FIG. 7 is a flow chart depicting an authorization operation of the portable communication device as it attempts to obtain authorization to use a process in accordance with the preferred embodiment of the present invention.

Referring to FIG. 7, a flow chart 600 depicting an authorization operation of the portable communication device 122 as it attempts to obtain authorization to use a process in accordance with the preferred embodiment of the present invention begins with any one of steps 602, 604 and 606. In step 602 the user installs a hardware or software module and registers the hardware or software module by sending preferably an authorization medium 375 comprising a registration form and proof of purchase receipt. In step 606 the user can receive over-the-air (OTA) programming of a software process. The request for an OTA software download can be performed by the user by way of a conventional telephone 124 call to the system provider. It will be appreciated that other ways can be used for requesting OTA programming of a software process, such as by the use of appropriate functions provided by the user controls 364, in the portable communication device 122 for requesting software processes. Once a software or hardware module has been added to the portable communication device 122 by way of OTA programming or userinstallation, the user can request execution of the process in step 604. In step 610 the process is immediately executed without initial authorization. It will be appreciated that the portable communication device 122, optionally, can be programmed by the system provider to skip step 610. In step 612 the processor 308 of the portable communication device 122 checks for the presence of an internal authorization record 382 in the authorization records 380 stored in the RAM 378. Each internal authorization record 382 is decrypted using the secure encryption key 312 stored in the ROM 310. A match is checked between the process name 386 of the internal authorization record 382 and the process name of the requested process. If a match is not found, the processor 308 proceeds to step 614 where an encrypted external authorization request message is constructed comprising the authorization request command 432, the address 434 of the portable communication device 122, the process name 436, the process size 438, and the secure CRC 440 of the process executable 398 requested. In step 616 the encrypted external authorization request is transmitted to the base stations 116. In step 618 the processor 308 waits for an external authorization response message from the base stations 116. If no external authorization response message has been received, then in step 628 a time-out (TMO) indicator is checked. If the TMO indicator has expired, then in step 630 a resend counter is checked for re-transmission requests. If re-transmission requests of the encrypted external authorization request message have been exceeded, then in step 632 the process execution is denied and the user is alerted by the alerting device 366 and display 368 of the portable communication device 122. If the resend counter has not been exceeded, then the processor 308 resends the encrypted external authorization message in step 614. If in step 628 the TMO indicator has not expired, then the processor 308 continues to wait for an external authorization response message from the base stations 116. If an external authorization response message is received, then step 620 checks if the requested process has been authorized for execution. If the requested process has been denied authorization, then step 640 is invoked, where the process is denied execution, and subsequently discarded in step 642 alerting the user to authorization denial. If the requested process has been authorized for execution, then in step 622 preferably two bytes are chosen from within the process executable 398 of the hardware or software module to create a 16 bit random polynomial generator. The random bytes are chosen using the real-time clock 399 and user controls 364 as described above. In step 624, the processor 308 generates a random CRC over the process executable 398 of the authorized hardware or software module. In step 626, an internal authorization record 382 is created comprising the random address pointers 384, the process name 386, the process size 387, the random CRC 388, and the expiration time 390 of the authorized process. The internal authorization record 382 is encrypted with the secure encryption key 312 stored in the ROM 310. Once the internal authorization record 382 has been created, the processor 308 continues to step 638 where process execution is invoked if it has not already been invoked by step 610.

In the case where in step 612 an internal authorization record 382 is found, the processor 308 continues to step 636 where the process verification elements are decrypted and then checked against the requested process executable 398. If the process verification elements are determined to be valid, then in step 638 process execution is invoked if it has not already been invoked by step 610. Validation of the process verification elements consists of matching the random CRC generated over the process executable 398 of the requested hardware or software module with the random CRC found in the internal authorization record. If the process verification elements are determined to be invalid, then in step 640 process execution is denied, and in step 642 the process is discarded from memory (for a software module) and an alert signal is created. The alert signal is preferably an audible and visual alert signal using the alerting device 366 and display 368 of the portable communication device 122. Optionally, an alert signal can be sent to the controller 112 alerting the communication system that an attempt to use an invalid hardware or software module has been detected.

Thus, it should be apparent by now that the present invention provides a method and apparatus for controlling utilization of a hardware or software process added to a portable communication device 122. In particular, the present invention provides a novel method and apparatus for remotely authorizing software and hardware modules added to a portable communication device 122. With the present invention, the authenticity of process executables 398 used by software and hardware modules can advantageously be validated by the fixed portion 102 of the communication system. In addition, the fixed portion 102 of the communication system can keep track of unauthorized installations and can act upon unauthorized additions of software and hardware modules to the portable communication devices 122 by disabling operation of a portable communication device 122 using OTA techniques. Another advantage of the present invention is the option for the system provider to program the portable communication device 122 to execute a hardware or software process without receiving immediate authorization. This option provides a user immediate access to a hardware or software process without burdening the user with the delay of receiving authorization for the process. The present invention also provides an authorization method which is secure for both inbound and outbound messaging by using a message encryption technique described above.

What is claimed is:

1. An apparatus at a fixed portion of a communication system for authorizing utilization of software in a portable portion of the communication system, the apparatus comprising:

a processor;

a memory coupled to the processor for maintaining a list of authorized software corresponding to the portable portion;

a request receiver element coupled to the processor for receiving a request from the portable portion, the request including an address identifying the portable portion, and a software name;

a list checker element coupled to the processor for checking the list of authorized software corresponding to the portable portion identified by the address, to determine whether the software corresponding to the software name is authorized; and an external authorization element coupled to the processor for transmitting the external authorization to the portable portion in response to the software being authorized for the portable portion.

2. The apparatus of claim 1 in which the request includes a secure checksum.

3. The apparatus of claim 2 in which the secure checksum is a secure cyclic redundancy check of the software for which the portable portion is requesting authorization.

4. The apparatus of claim 3 in which the apparatus uses a secure polynomial stored in the memory of the apparatus to calculate the secure cyclic redundancy check.

5. The apparatus of claim 1 in which the request includes a software size.

6. A portable communication device in a communication system having a fixed portion, the portable communication device comprising:

a processor;

an authorization element coupled to the processor for obtaining usage authorization for utilizing software in the portable communication device, in which the authorization element generates an external authorization request, and in which the authorization element communicates with the fixed portion to obtain the usage authorization in response to the external authorization request, and in which the external authorization request includes a secure checksum; and a second authorization element coupled to the processor for allowing utilization of the software, in response to usage authorization being obtained from the fixed portion.

7. The portable communication device of claim 6 in which the secure checksum is a secure cyclic redundancy check of the software for which the portable communication device is requesting authorization.

8. The portable communication device of claim 7 in which the secure cyclic redundancy check is generated by the portable communication device by using a secure polynomial stored in the portable communication device.

9. A portable communication device in a communication system having a fixed portion, the portable communication device comprising:

a processor;

an authorization element coupled to the processor for obtaining usage authorization for utilizing software in the portable communication device, in which the authorization element generates an external authorization request, and in which the authorization element communicates with the fixed portion to obtain the usage authorization in response to the external authorization request, and in which the external authorization request includes at least one of: an address identifying the portable communication device, a software name and a size of the software; and a second authorization element coupled to the processor for allowing utilization of the software, in response to usage authorization being obtained from the fixed portion.

\* \* \* \* \*